P. A. DUBUS.
METHOD FOR FORMING TIE JOINTS.
APPLICATION FILED NOV. 7, 1914.
1,141,046.
Patented May 25, 1915.
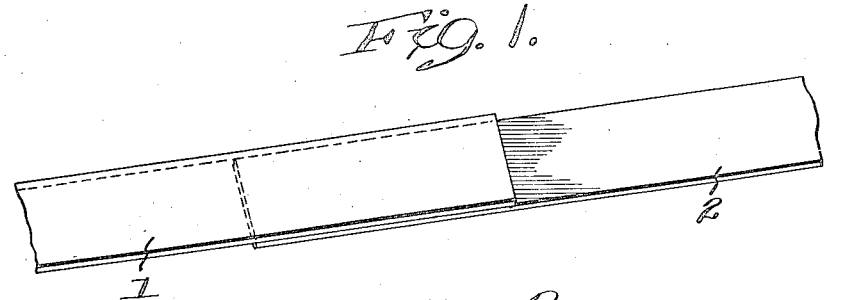
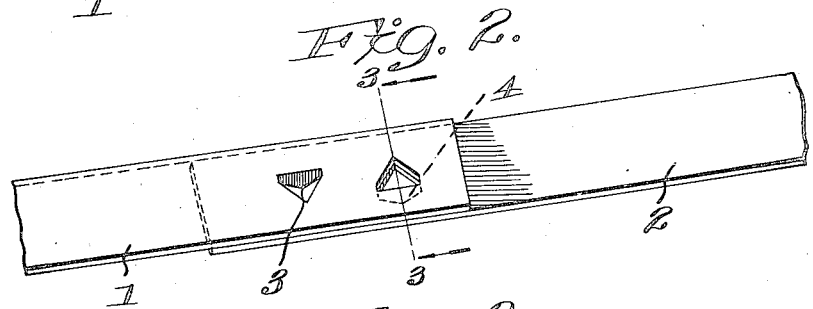
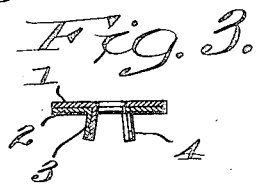
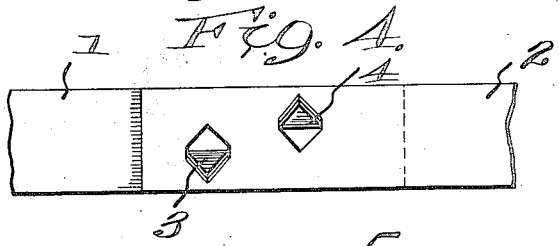
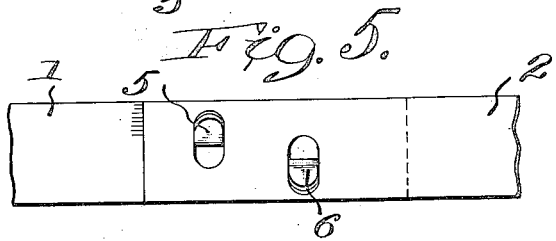
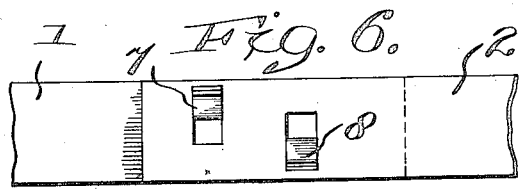

UNITED STATES PATENT OFFICE.

PETER ARMAND DUBUS, OF NEW ORLEANS, LOUISIANA.

METHOD FOR FORMING TIE-JOINTS.

1,141,046.

Specification of Letters Patent.    Patented May 25, 1915.

Application filed November 7, 1914. Serial No. 870,885.

*To all whom it may concern:*

Be it known that I, PETER ARMAND DUBUS, a citizen of the United States, residing at New Orleans, in the parish of Orleans and State of Louisiana, have invented certain new and useful Improvements in Methods for Forming Tie-Joints; and I do hereby declare the following to be a full, clear, and exact description of the invention, such as will enable others skilled in the art to which it appertains to make and use the same.

The present invention relates to methods for forming joints in bale ties and the like, and aims to provide an improved method designed to dispense with the method of riveting, now generally employed, which is tedious, inconvenient and expensive.

Another object of the present invention resides in providing an improved method for joining the ends of bale ties, wherein the joint is effected by tongues punched from the overlapping ends of the ties, without the use of other fastenings of any kind.

It is a further object of the present invention to provide an improved method of joining the ends of bale ties and the like which will produce a strong and effective joint, calculated to withstand the pressure of the bale.

With the foregoing and other objects in view the invention consists in the steps and processes hereinafter described and specifically pointed out in the appended claims.

Reference is had to the accompanying drawings, wherein similar parts are indicated by similar reference symbols throughout the several views.

Figure 1 is a fragmentary perspective view of the ends of a bale or other tie, or band, illustrating the first step of the method as employed in the present invention; Fig. 2 is a similar view illustrating the second step in the improved method; Fig. 3 is a transverse sectional view taken on the line 3—3 of Fig. 2; Fig. 4 is a bottom plan view of the joint as completed; Fig. 5 is a bottom plan view of a slightly modified form illustrating a different shape of locking tongue; and Fig. 6 is a bottom plan view of a still further modified form of tongue.

Referring more particularly to the drawing, 1 and 2 designate the free ends of a bale, or other tie, or band, to be joined; and, in accordance with the present method, the same are first positioned in the overlapping relation shown in Fig. 1, whereby to provide double thicknesses from which the locking tongues may be punched or otherwise produced. After the ends 1 and 2 have been so positioned the same are punched or otherwise operated upon, preferably at a plurality of points, as indicated in Figs. 2 and 3, to provide pairs of superposed tongues 3 and 4. The punching operation is advantageously effected diagonally of the ends 1 and 2, as illustrated in the cross-section in Fig. 2, with the result that the tongues produced from the upper overlapping end 1 will be relatively longer than the tongues of the lower end 2. In this manner the upper tongues, which are bent about the more remote center and fold over the lower tongues, and which would ordinarily terminate short of the ends of said lower tongues, are brought to position substantially flush with the same when the tongues are bent over as in Fig. 4. Upon completion of the punching operation the tongues are bent over in superposed pairs against the adjacent face of the tie, as will be understood.

As illustrated in Figs. 2, 3 and 4, the tongues are preferably of triangular configuration, whereby to reduce the amount of material punched out and correspondingly reduce the area of the weakened portions in the tie; and at the same time provide a relatively elongated base line about which the tongues are bent and which affords the strength for the joint. It will further be seen that the triangular tongues are, in accordance with the preferred form, punched out in reverse order and bent over in opposite directions. It will be understood, however, that the invention is not limited to the triangular tongues, as the same may be employed to produce the substantially semi-circular tongues 5 and 6, illustrated in Fig. 5, or the rectangular tongues 7 and 8, shown in Fig. 6.

I have illustrated and described preferred and satisfactory constructions, but obvious changes could be made in the herein described methods without departing from the spirit of my invention.

I claim:—

1. The herein described method of forming joints in bale ties, which consists in positioning the free ends of the tie in overlapping relation, punching tongues at a plurality of points from the overlapping thicknesses, and bending said tongues in superposed pairs, transversely as of the tie, and in substantial alinement with the direction of the pulling strain on the tie, and in reverse directions, down against the face of the tie, substantially as described.

2. The herein described method of forming joints in bale ties, which consists in positioning the ends of the tie in overlapping relation, punching triangular tongues from the overlapping thicknesses at a plurality of points, the bases of said triangles being substantially parallel to the longitudinal axis of the tie, and bending said tongues about the bases of said triangles in reverse directions down against the face of the tie, substantially as described.

In testimony whereof, I affix my signature, in presence of two witnesses.

PETER ARMAND DUBUS.

Witnesses:
J. F. DUBUS,
F. D. CHARBONNET, Jr.